United States Patent Office 3,221,509
Patented Dec. 7, 1965

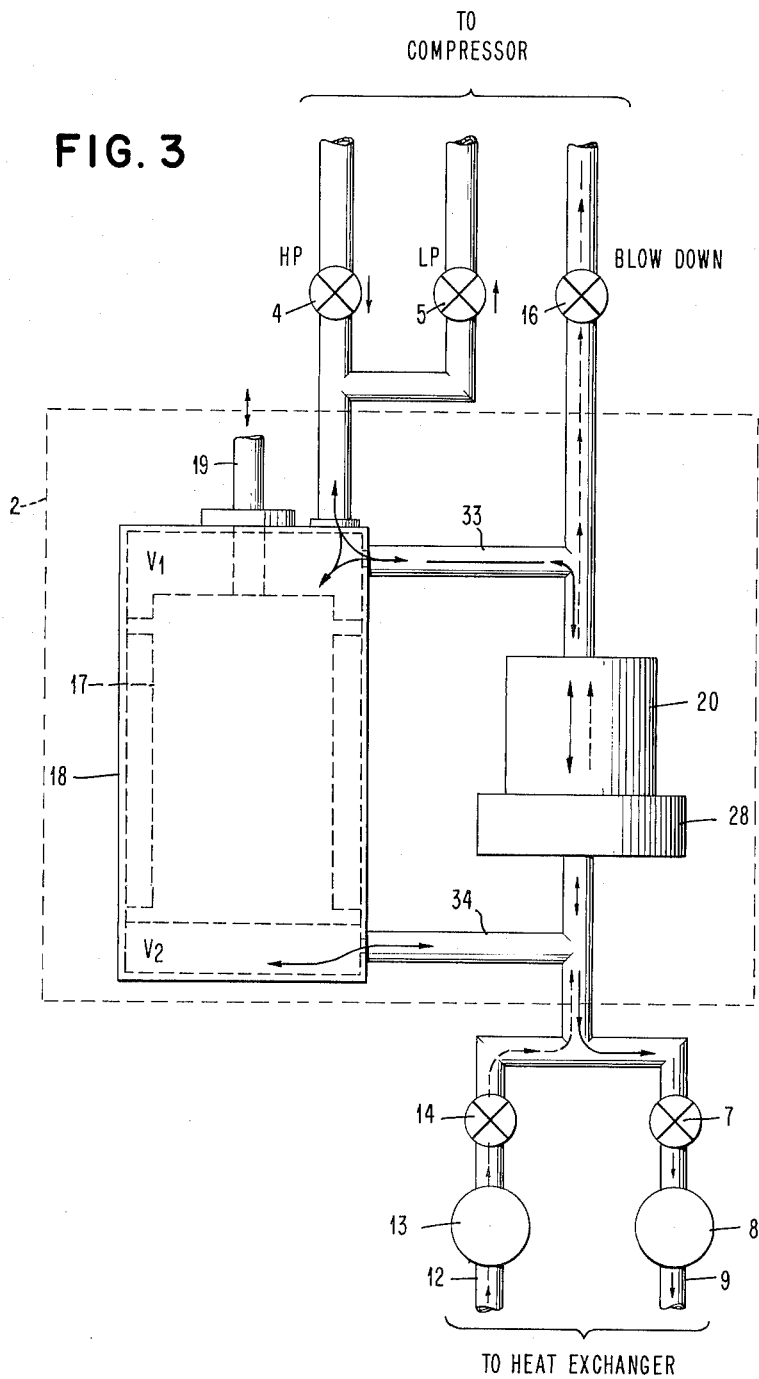

3,221,509
REFRIGERATION METHOD AND APPARATUS
Richard L. Garwin, Scarsdale, N.Y., assignor to International Business Machines Corporation, New York, N.Y., a corporation of New York
Filed Jan. 16, 1964, Ser. No. 338,089
14 Claims. (Cl. 62—6)

This invention relates to methods and apparatus for refrigeration and more particularly to a method and apparatus utilizing Joule-Thomson cooling for producing cryogenic temperatures.

Two independent factors are responsible for the recent upsurge of interest in cryogenic devices. First, a need for cryogenic devices had arisen from the recognition that certain physical and electrical effects could be enhanced by operating devices which exhibited these effects at temperatures near absolute zero. The second factor was the availability of reasonably efficient and reasonably priced refrigeration systems which made low-temperature investigations and applications possible. The investigations, in turn, have broadened into the science of cryogenics, and more and more applications are being discovered for devices in the low temperature environment.

At present, cryogenics, like all scientific areas and devices, is being probed for new advances and applications. Lower temperatures, higher efficiencies, and longer operating cycles are demanded. High reliability, low production costs, weight reduction, and smaller size are now required if a refrigeration system is to be competitive. Many of the above mentioned criteria have been met by miniaturization, advances in materials, new refrigeration cycles and by novel design of heat engines, but the prior art systems remain basically the same as far as the utilization of component parts of refrigeration system is concerned. Most, if not all, prior art refrigeration systems rely on heat transfer techniques between an engine stream and the actual working fluid to produce temperatures near absolute zero. Such systems involve the utilization of a plurality of heat exchangers cooperating with the engine stream of a heat engine to produce the desired low temperature. While satisfactory results have been obtained in the past, the heat exchangers are now the weak link from the point-of-view of cost and efficiency in an otherwise highly efficient refrigeration system. Efforts have been made to improve the design and efficiency of heat exchangers but these efforts have met with limited success. One solution is to substitute regenerators in the refrigeration system since such devices are simpler, cheaper and more efficient than counterflow heat exchanges. Efficiency does, in fact, improve when such a substitution is made. Prior art has made use of heat exchangers external to the engine to cool an auxiliary Joule-Thomson stream. Supplying clean gas to such a system is very difficult and unless heroic measures are taken the Joule-Thomson system soon becomes clogged. The clogging is primarily due to the unidirectional flow characteristic of such systems which causes a build up of condensable contaminants in the exchangers and Joule-Thomson valve. A need, therefore, exists for a refrigeration system in which the more efficient system can be utilized without being subject to clogging, which in turn will lead to the elimination of components such as heat exchangers from such systems.

It is, therefore, an object of this invention to provide a refrigeration system and method which are superior to prior art systems and methods.

Another object is to provide a refrigeration system which is simpler and more efficient than presently known systems.

A further object is to provide an improved refrigeration system which is not subject to regenerator and Joule-Thomson stream clogging.

Yet another object is to provide a refrigeration system in which the engine stream is converted directly to a Joule-Thomson stream. The engine stream is defined as the low temperature fluid output of a heat engine resulting from a heat exchange cycle within the engine.

Still another object is to provide a refrigeration apparatus and method which reduces the number of heat exchangers required for such systems.

Another object is to provide refrigeration apparatus wherein bi-directional fluid flow through the heat engine is utilized.

A feature of this invention is the utilization of heat engine means for providing an engine stream, means for providing a Joule-Thomson stream connected between the heat engine means and a load, and means for recirculating the Joule-Thomson stream from the load through at least a portion of the heat engine means to provide a refrigeration system from which a number of heat exchangers have been eliminated and in which clogging of the regenerators and Joule-Thomson valve has also been eliminated.

Another feature of this invention is the utilization of rectification and accumulator means to smooth out pulsations in the engine stream and deliver a substantially constant pressure stream to a Joule-Thomson valve.

Still another feature of this invention is the utilization of a check valve and an accumulator to accumulate the Joule-Thomson stream after application to a load for a major portion of a given cycle and to release the accumulated stream for recirculation through the heat engine during a minor or "blow-down" portion of the given cycle. The term "blow-down" refers to that portion of the refrigeration cycle during which a valve is opened to cause the low temperature fluid of the system to be recirculated back through at least a portion of the heat engine to the low pressure side of the system compressor. The "blow-down" step is accomplished at lower pressures than the usual exhaust pressure.

Yet another feature of this invention is the utilization of a refrigeration method comprising the steps of producing an engine stream in a heat engine during a major portion of a given refrigeration cycle; applying the engine stream to a Joule-Thomson valve during said given cycle to produce a Joule-Thomson stream and, recirculating the Joule-Thomson stream through the heat engine for a minor portion of the given cycle to provide for heat transfer in the heat engine during recirculation.

The foregoing and other objects, features and advantages of the invention will be apparent from the following more particular description of a preferred embodiment of the invention, as illustrated in the accompanying drawings.

FIGURE 3 is a diagrammatic representation of a heat engine incorporating an external regenerator which may be utilized in the system of FIGURE 1 showing engine stream and Joule-Thomson flow paths.

Figure 1:
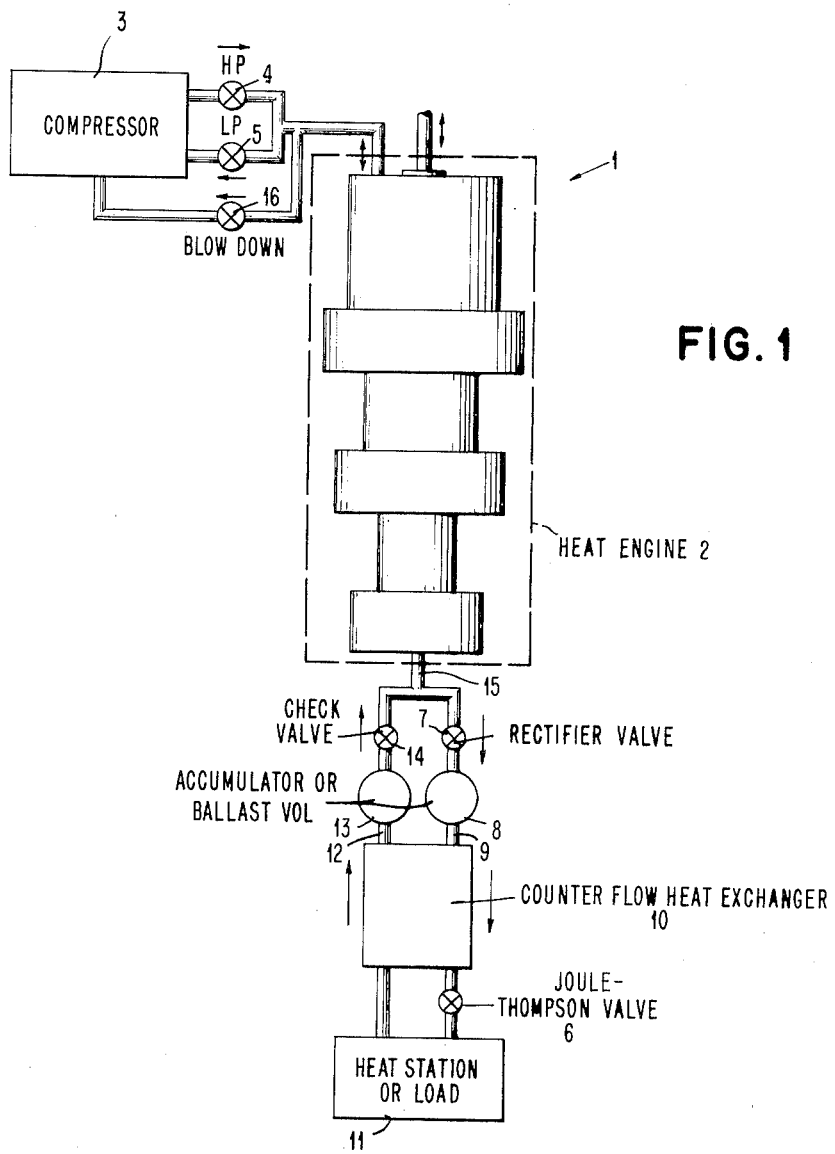
FIGURE 1 is a simplified diagrammatic representation of the refrigeration system of this invention.

Referring now to FIGURE 1, there is shown a simplified diagrammatic representation of a refrigeration system 1 in accordance with the present invention. A heat engine means, shown generally at 2, provides a cooled helium engine stream at its output in a manner to be more fully explained hereinafter. The output engine stream of heat engine 2 is characterized by pressure pulsations which arise from the cyclic compressions and expansions of the helium gas during the refrigeration cycle utilized in conjunction with heat engine 2. The helium gas to be cooled in heat engine 2 is supplied by a compressor or other pressure source shown generally at 3. The helium gas flow is introduced and exhausted from heat engine 2 by high pressure valve 4 and low pressure valve 5, respectively, at appropriate times during a given refrigeration cycle. Before applying the cooled engine stream to a Joule-Thomson valve, shown schematically at 6, the engine stream is applied to a rectifier or check valve 7 which permits the engine stream to flow only when a high pressure exceeding that of the ballast volume 8 is attained. In this manner, a pulsating, unidirectional high pressure engine stream is obtained at the output of valve 7. At this point, the high pressure pulsating engine stream is applied to an accumulator or ballast volume 8, of given volume, wherein a substantially constant pressure volume of helium is accumulated. The engine stream exits from accumulator 8 at substantially constant pressure, passes through a high pressure channel 9 of a counterflow heat exchanger 10 and is applied at substantially constant pressure to Joule-Thomson valve 6. The cooled engine stream then expands, at constant flow rate, through Joule-Thomson valve 6 and cools further or actually liquefies, depending on the heat load at the heat station 11 where a device, such as a maser, operable at cryogenic temperatures, is located.

Before continuing with the description of the refrigeration system, it should be noted that two novel departures have already been made from prior art refrigeration systems. First, the engine stream output of heat engine 2 has been converted directly to a Joule-Thomson stream and exits at such temperature where no condensable contaminants could be present and, second; the pulsating engine stream has been rectified and accumulated to provide a constant pressure engine stream prior to its delivery to Joule-Thomson valve 6. In prior art systems, the engine stream was never converted directly to and utilized as a Joule-Thomson stream. Rather, the pulsating engine stream was passed at different temperature stages through a series of heat exchangers wherein, by heat transfer, another fluid stream, at constant pressure, was cooled prior to application to a Joule-Thomson valve. Thus, two independent fluid streams were utilized in conjunction with a plurality of heat exchangers. Pulsations in the engine stream were of no consequence in the prior art systems, since the use of two independent streams permitted the application of one stream to a Joule-Thomson valve at constant pressure. The presence of such pulsations, however, prevented the direct utilization of the engine stream at the Joule-Thomson valve. Because of the requirement that such expansion must take place at constant pressure.

Returning now to FIGURE 1, means are provided for recirculating the Joule-Thomson stream back through heat engine means 2. The means includes a low pressure channel 12, of heat exchanger 10, where, by heat transfer, the constant pressure engine stream in high pressure channel 9 is cooled prior to application to Joule-Thomson valve 6. At this point, it should be noted, that heat exchanger 10 is the only counter-flow heat exchanger utilized in the present system as opposed to the several utilized in prior art systems. The recirculation means further includes a low pressure accumulator or ballast volume 13 and a check valve 14 which is utilized to release the accumulated low pressure Joule-Thomson stream through heat engine 2 at an appropriate time in the given refrigeration cycle which provides maximally efficient heat transfer from the regenerators to the effluent gas. Check valve 14 is connected to the output tubulation 15 of heat engine 2 and the Joule-Thomson stream is prevented from passing into accumulator 8 by valve 7 which will open only when the pressure in the engine is less than that in the low pressure ballast. The recirculation of the Joule-Thomson stream, at a pressure difference permitting a close approach to temperatures near absolute zero, is facilitated by providing a "blow-down" valve 16 which is connected to the input end of heat engine means 2 and to the low pressure side of compressor 3. Valves 14 and 16 are, of course, actuated sequentially by means, not shown, to provide a path through heat engine 2 to compressor 3. The Joule-Thomson stream in recirculating through heat engine 2 encounters a plurality of regenerators disposed internally (FIG. 2) or externally (FIG. 3) of heat engine 2 and the regenerators are cooled, aiding the succeeding refrigeration cycle in a manner which will be more fully described hereinafter.

From the foregoing, it may be seen that a refrigeration system has been attained which during a given cycle, cools a gas to provide an output engine stream during a major portion of the given cycle and recirculates a Joule-Thomson stream through a heat-engine for a minor portion of the given cycle. It should be kept in mind, that in spite of the different operations taking place during the major and minor portions of the given cycle that a Joule-Thomson stream is being provided continuously during the given cycle due to the action of rectifier valve 7 and accumulator 8 which provide a substantially constant pressure engine stream flow even when the heat engine means 2 is being blown down through valves 14 and 16. It should be understood that the valves 7 and 14 which are shown as check valves may equally well be externally operated.

Figure 2:
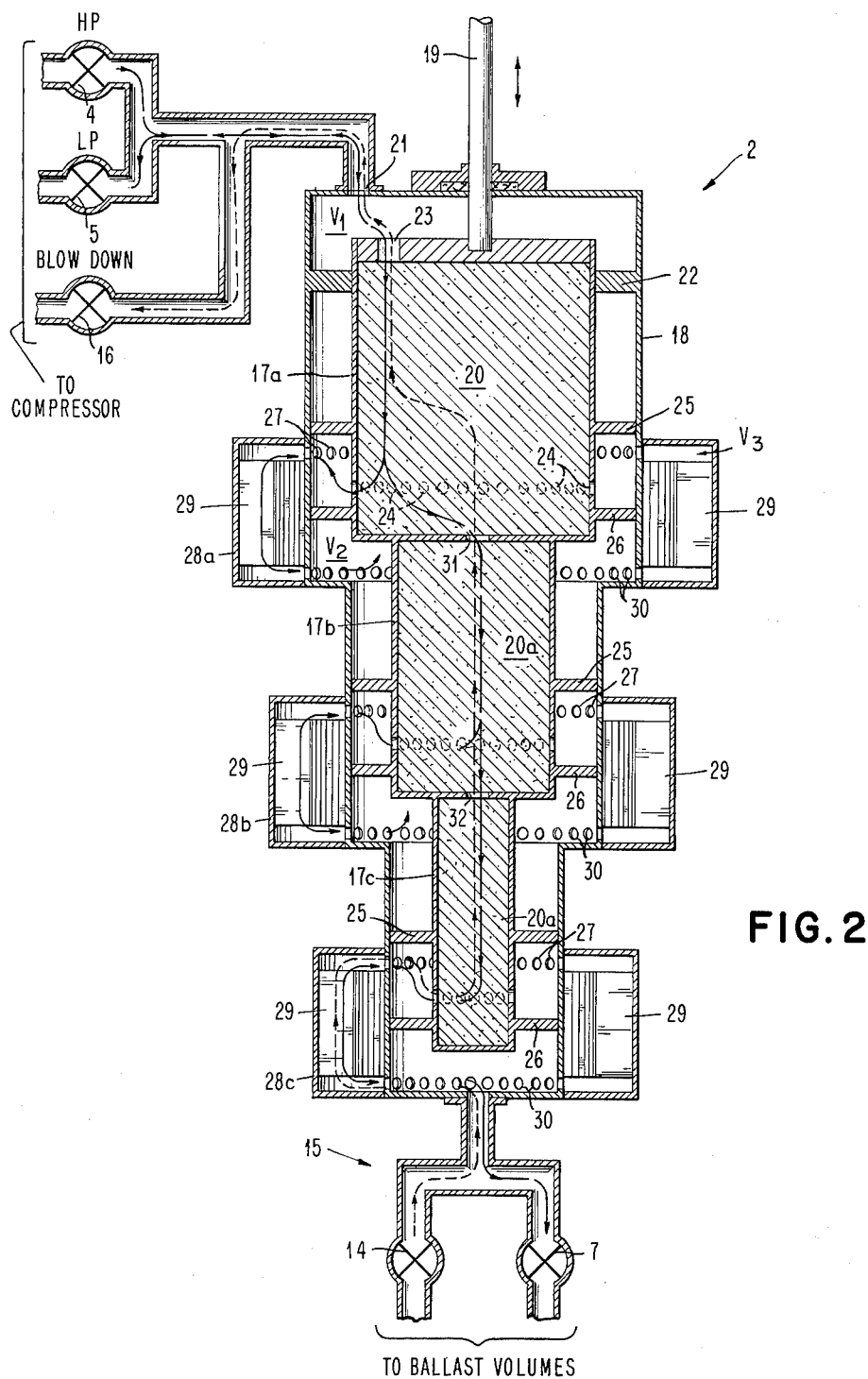
FIGURE 2 is a diagrammatic cross-sectional representation of a heat engine utilized in the system of FIGURE 1 showing the engine stream path and the recirculating path of the Joule-Thomson stream through the heat engine.

Referring now to FIGURE 2, there is shown a diagrammatic representation of the details of heat engine 2 which can be utilized in the refrigeration system of this invention. The cooling cycle utilized is called the Stirling cycle and is well known to those skilled in the refrigeration art. In the description that follows, the Stirling cycle will be described as it applies to the heat engine of FIGURE 2.

In FIGURE 2, a multi-displacer heat engine 2 is shown having three displacers 17a, 17b and 17c. Displacers 17 are disposed coaxially within a casing 18 in relatively close fitting relationship with the inner surface of casing 18 and are adapted to move up and down in unison within casing 18 under control of reciprocating means 19. A regenerator matrix 20, 20a is shown disposed coaxially and within each of the displacers 17. Regenerators 20 act to store heat during a portion of the refrigeration cycle and, during another portion of the cycle discharge the stored heat to the working fluid to remove heat from the system. A number of well-known regenerator materials may be utilized in the present system. Regenerator 20 is made of bronze screen, 20a of lead shot. Regenerators 20, 20a are the components which are subject to clogging by condensable contaminants. Bi-directional flow is maintained during a complete cycle. That is, bi-directional flow occurs during the Stirling part of the cycle along with a slight downward flow to supply the Joule-Thomson stream, then, a cessation of the Stirling flow followed by an upward flow of stored helium gas takes place. As will be seen from what follows, this system eliminates many of the problems previously encountered. In FIG. 2, helium is introduced within casing 18 by actuating high pressure valve 4. The helium flows through port 21 and pressurizes a volume $V_1$ above displacer 17a. This pressurization step takes place when the displacers 17 are at the low point of the reciprocation stroke. Displacers 17, in FIGURE 2, are shown essentially at the midpoint of a stroke for the sake of convenience in explaining the refrigeration cycle. As will be described later, as the engine cycles, heat energy is absorbed in the lower portions of the engine 2; and is delivered externally of engine 2 and dissipated in the compression system 3. The heat flow is unidirectional from the bottom of the engine towards the top. The regenerators 20 because of their relatively poor longitudinal thermal conductivity have a large thermal gradient from top to bottom thereof. However, it should be remembered, that while the longitudinal conductivity is poor, their heat absorption capacity (specific heat) is high and they act as very efficient storage units for heat energy, or as in the present instance, the lack of this energy. A dynamic seal 22, fixed to the inner surface of casing 18 prevents passage of the pressurized helium between displacer 17a and the inner surface of casing 18. The helium is, therefore, forced through regenerator port 23 into regenerator 20 where heat is absorbed from the helium as it passes through the regenerator. The cooled gas exits from a plurality of apertures 24 which have been drilled through the wall of displacer 17a at a point near the bottom of displacer 17a. Two displacer seals 25 and 26, attached to displacer 17a channel the gas through upper casing ports 27 in casing 18 into heat station 28a which is mounted circumferentially about casing 18. Heat station 28a has a plurality of copper fins 29 extending radially inwardly from the inner surface of the heat station wall which defines a given volume $V_3$. Simultaneously, with the foregoing steps, gas, under high pressure, is being passed through openings 31 and 32 in displacers 17a and 17b, respectively, and caused to pass through regenerators 20a disposed in displacers 17b and 17c. Heat stations 28b and 28c are pressurized in a manner similar to heat station 28a and the heat engine 2 is in readiness for the upward stroke, at constant pressure, in the refrigeration cycle.

Reciprocating means 19, in moving displacers 17 upward, causes $V_1$ to diminish from its given volume to practically zero volume and causes $V_2$ to increase from practically zero volume to its maximum given volume. As displacer 17a moves upwardly, the pressure in $V_2$ decreases slightly, and pressure in $V_1$ increases slightly allowing a flow of gas through regenerator 20, past fins 29 in heat station 28a, out lower casing port 30 and into $V_2$ which is now present because of the upward motion of displacer 17a.

At the uppermost point of the stroke, the high pressure valve 4 is closed and low pressure valve 5 is opened permitting the gas to expand. The gas flows from $V_2$, through lower casing port 30, past fins 29, out upper casing port 27, through apertures 24 and into regenerator 20. From regenerator 20, the gas returns to the low pressure side of the compressor through ports 23 and 21, respectively. It is at this point in the refrigeration cycle that cooling of the helium takes place. Cooling takes place by virtue of the work done by the helium gas in the engine 2 in forcing the helium gas itself through the low pressure valve 5 and restrictive plumbing. If the compressor is regarded as a large, room-temperature piston-cylinder combination, then, at this stage, the helium gas in the engine 2 is doing work on the retreating piston. In doing this work, the gas must give up thermal energy, and in giving up energy will cool. Thus, energy in the form of heat will be absorbed, from the region outside the engine by heat stations 28a, 28b, 28c, as the gas cools below the ambient temperature of the heat station 28a. This is facilitated by the motion of the gas through finned heat station 28a as it is acted upon by the motion of the displacer 17a. The contact of the gas with heat station 28a is not as good as with the regenerators 20, 20a, and as a result, the regenerator may become colder than the heat station in the region of the heat station 28a. Equilibrium occurs when the temperature of the cold gas at the heat station 28a is sufficiently lower than the temperature of the heat station so that the influx of heat is equal to the energy extracted when the pressure is decreased. Prior to the equilibrium condition the regenerator temperature is lowered each cycle and the thermal gradient increased. It should be kept in mind that the temperature at the regenerator port 23 is always higher than the temperature at heat station 28a and that a temperature gradient exists between the top and bottom of the regenerators 20, 20a.

Thus, gas entering heat stations 28a, 28b, 28c after a number of cycles, is much cooler than when the refrigeration cycle was begun. The gas at the end of each cycle, after passing through the regenerators 20, leaves them cooler than when the gas entered, so that on the next high pressure portion of the cycle, gas passing through the regenerators arrives at the heat stations at a temperature lower than at the beginning of the previous cycle.

Returning now to the refrigeration cycle, low pressure valve 5 has been opened and the gas has flowed back to the low pressure side of the compressor. Displacers 17 are now moved downward at constant pressure and the gas in $V_2$ is caused to flow, at constant pressure, through heat stations 28a, 28b and 28c and regenerators 20, 20a to $V_1$ where it remains until high pressure valve 4 is actuated to begin a new cycle.

It should be appreciated that what has been described in connection with only the upper most stage of engine 2, also occurs in the other two stages of the engine. The net effect is that each stage is colder than the preceding stage when an equilibrium condition is established. After a number of cycles, equilibrium is established and an engine stream, at low temperature, is delivered to output tubulation 15, where, on the high pressure portion of the cycle, it passes through rectifier valve 7 to ballast volume 8. The flow of gas through the heat engine is shown by the solid line arrows; the oppositely directed pointers in the region of heat stations 28a, 28b, 28c indicating that the gas flow reverses direction during the high pressure and low pressure portions of the refrigeration cycle. The single headed arrows through regenerators 20, 20a indicate the small volume of cooled helium which ultimately arrives, at low temperature (less than 23° K.), at tubulation 15 as the engine stream. The dotted arrows show the path of the gas flow during the blow-down portion of the refrigeration cycle.

It should be recalled that the Joule-Thomson stream after cooling load 11 has been accumulated in accumulator 13 and is held there by check valve 14 during the major portion of the given refrigeration cycle. After a given number of cycles, during which an engine stream is utilized, blow-down valve 16 and check valve 14 are actuated sequentially and cooled helium gas is exhausted from low pressure accumulator 13 through heat engine 2 when the engine pressure has decreased to a value below that of accumulator 13, through blow-down valve 16 to the low pressure side of the compressor 3 which is at a pressure lower than that applied during the exhaust portion of the refrigeration cycle. The foregoing steps permit the achievement of a lower temperature than if the gas were allowed to expand only to the normal exhaust pressure and return through check valve 14 during the low pressure phase of each engine cycle. The dotted arrows in FIGURE 2 show the flow of gas directly through the internally disposed regenerators 20, 20a of heat engine 2. The flow, in this manner, is accomplished by blowing down heat engine 2 when displacers 17a, 17b and 17c are in their uppermost position, after the valve 5 has allowed the pressure to drop to a predetermined value. Four things are accomplished by the "blow-down" step. First, the efficiency of the heat engine is enhanced, because the recirculation of the Joule-Thomson stream back through the regenerators increases the heat absorption capabilities of the regenerators by cyclically exposing them to the low temperature Joule-Thomson stream. Second, since the heat transfer in a regenerator is more efficient than that in an ordinary counterflow exchanger, the efficiency is further raised. Third, the recirculated flow of gas purges the regenerators cyclically of condensable contaminants thereby preventing clogging of the regenerators and improving the reliability of the system. Fourth, passing the cooled gas through the regenerators 20, 20a in the manner indicated, permits the elimination of the heat exchangers usually associated with all the cooling stages prior to the last stage and advantage can be taken of the elimination of radiative and conductive heat leaks associated with additional components. The elimination of the heat exchangers greatly reduces the cost of the refrigerator.

FIGURE 2 shows regenerators 20, 20a disposed internally of displacers 17a, 17b, 17c as a preferred embodiment but it should be appreciated that the method of this invention can be applied to heat engines which utilize regenerators which are disposed externally of the displacers.

FIGURE 3 shows a diagrammatic representation of one stage of a heat engine wherein a regenerator 20 is disposed externally of the displacer portion of heat engine 2. Displacer 17 causes gas which has entered $V_1$ under high pressure to be delivered to $V_2$ by forcing the gas through tubulation 33, to regenerator 20 thereby storing heat in regenerator 20. The gas passes from regenerator 20 into heat station 28 and then to $V_2$ through tubulation 34. This action takes place with valve 4 open. Valve 4 now closes. Valve 5 opens and the gas in $V_2$ expands. Heat is added to the gas as it passes through heat station 28 and regenerator 20 is cooled as the low pressure gas is forced back to the low pressure side of the compressor. The solid line arrows show the directions of flow through the heat engine during the major portion of the given refrigeration cycle which differs in no way from that described in connection with FIGURE 2. The dotted arrows show the direction of gas flow during the "blow-down" or minor portion of the refrigeration cycle and, as may be seen in FIGURE 3, the gas exits from accumulator 13 through check valve 14, passes through heat station 28, regenerator 20 and blow-down valve 16 to the low pressure side of a booster compressor. The same advantages accrue utilizing the arrangement of FIGURE 3 as have been outlined in connection with the use of internally disposed regenerators.

In a system utilizing the refrigeration method of this invention, a ratio of 10 working cycles to one blow-down cycle may be utilized but there is no reason why other cyclical arrangements could not be used as required by the various heat loads. The particular materials utilized in the construction of the heat engine and its components have not been detailed because such structures are well known to those skilled in the art. Also, the dimensions and construction of components such as regenerators, heat stations and valves have been broadly outlined so as not to limit the scope of the refrigeration method and means described hereinabove, since the dimensions and construction of the above mentioned components generally depend on such factors as the amount of cooling to be supplied, the ambient pressure and temperature conditions and the type of fluid used in the system. It should be appreciated that such gases as nitrogen, helium, hydrogen and oxygen can be utilized without departing from the spirit of the invention, to produce temperatures higher than the freezing points of these fluids.

While the invention has been particularly shown and described with reference to a preferred embodiment thereof, it will be understood by those skilled in the art that various changes in form and details may be made therein without departing from the spirit and scope of the invention.

What is claimed is:

1. Refrigeration apparatus comprising a heat engine, a load adapted to operate at cryogenic temperatures, means for cyclically introducing and exhausting a fluid to and from said heat engine wherein said fluid is cooled by a process of successive compressions and expansions, means for delivering said fluid to said load at substantially constant pressure disposed intermediate said heat engine and said load and means connected to said heat engine for cyclically blowing-down said fluid through said engine at pressures lower than said constant pressure.

2. A refrigeration system adapted to provide Joule-Thomson cooling at a load comprising means for providing an engine stream at relatively high pressure levels, means including a Joule-Thomson valve coupled to said first mentioned means and said load for providing a Joule-Thomson stream, and means including blow-down means connected to said first mentioned means for recirculating said Joule-Thomson stream from said load through said means for providing said engine stream at pressures substantially lower than said relatively high pressure.

3. A refrigeration system adapted to provide Joule-Thomson cooling at a load comprising means for cyclically providing an engine stream, means including a Joule-Thomson valve for providing a Joule-Thomson stream coupled to said first mentioned means and said load and means for cyclically recirculating said Joule-Thomson stream from said load through said means for cyclically providing said engine stream.

4. A refrigeration system adapted to provide Joule-Thomson cooling at a load comprising means including a Joule-Thomson stream from said load through said sec-stream to said load during a given cycle, actuable means coupled to said first mentioned means for providing an engine stream during a major portion of said given cycle and means including actuable blow-down means coupled to said second mentioned means for recirculating said Joule-Thomson stream from said load through said second mentioned means for a minor portion of said given cycle.

5. A refrigeration system according to claim 3 wherein said means for cyclically providing an engine stream includes a source of fluid, a heat engine adapted to convert said fluid to a high pressure, low temperature engine stream at the output thereof, and means for cyclically introducing and exhausting said fluid to and from said heat engine means.

6. A refrigeration system according to claim 5 wherein said means for cyclically introducing and exhausting said fluid to and from said heat engine means includes a compressor, an actuable inlet and exhaust valves to cyclically introduce said fluid at high pressure to said heat engine means and to cyclically exhaust said fluid from said heat engine means at low pressure, respectively.

7. A refrigeration system according to claim 5 wherein said heat engine means includes at least a regenerator disposed internally of said heat engine.

8. A refrigeration system according to claim 5 wherein said heat engine means includes at least a regenerator disposed externally of said heat engine.

9. A refrigeration system according to claim 3 wherein said means for providing a Joule-Thomson stream includes a Joule-Thomson valve, an inflow heat exchange channel and means for applying a substantially constant pressure engine stream to said Joule-Thomson valve, said means for applying pressure, said inflow channel and said Joule-Thomson valve being disposed in the last mentioned series relationship.

10. A refrigeration system according to claim 9 wherein said means for applying a constant pressure engine stream to said valve includes means for rectifying pressure pulsations in said engine stream and accumulator means coupled to said rectifying means adapted to supply a constant pressure engine stream to said Joule-Thomson valve.

11. A refrigeration system according to claim 3 wherein said means for recirculating said Joule-Thomson stream through said means for providing said engine stream includes an outflow heat exchanger channel and means for maintaining a substantially predetermined constant exhaust pressure at said outflow heat exchanger channel disposed between said outflow channel and said means for providing said engine stream.

12. A refrigeration system according to claim 11 wherein said means for maintaining a substantially predetermined constant exhaust pressure includes an accumulator coupled to said outflow channel and a check valve coupled to said means for providing said engine stream adapted for cyclic operation to permit said Joule-Thomson stream to recirculate through said means for providing said engine stream.

13. A refrigeration system according to claim 3 wherein said means for recirculating said Joule-Thomson stream through said means for providing said engine stream further includes valve means coupled to said means for providing said engine stream for cyclically blowing-down said Joule-Thomson to predetermined pressure.

14. A refrigeration system adapted to provide Joule-Thomson cooling at a load comprising a heat engine adapted to provide a low temperature fluid at the output thereof, a load, a Joule-Thomson valve connected between said output and said load, and means including blow-down means coupled to said heat engine for recirculating said fluid via said output from said load through said heat engine.

References Cited by the Examiner

UNITED STATES PATENTS

| | | | |
|---|---|---|---|
| 1,321,343 | 11/1919 | Vuillemier | 62—88 |
| 2,906,101 | 9/1959 | McMahon | 62—6 |
| 2,907,175 | 10/1959 | Kohler | 62—6 |
| 2,966,035 | 12/1960 | Gifford | 62—6 |
| 3,101,596 | 8/1963 | Rinia | 62—6 |
| 3,115,014 | 12/1963 | Hogan | 62—6 |
| 3,115,015 | 12/1963 | Hogan | 62—6 |
| 3,115,016 | 12/1963 | Hogan | 62—6 |
| 3,148,512 | 9/1964 | Hoffman | 62—6 |

WILLIAM J. WYE, *Primary Examiner.*
ROBERT A. O'LEARY, *Examiner.*